Oct. 18, 1927.

R. W. HAGEL

PERCOLATOR

Filed Aug. 17, 1925

Robert W. Hagel, Inventor

By Richard B. Owen

Attorney

Witnesses

Robert W. Hagel, Inventor

Patented Oct. 18, 1927.

1,646,022

UNITED STATES PATENT OFFICE.

ROBERT W. HAGEL, OF NEW ORLEANS, LOUISIANA.

PERCOLATOR.

Application filed August 17, 1925. Serial No. 50,787.

This invention relates to certain new and useful improvements in percolators adapted for use in facilitating making of coffee, tea and other beverages.

The primary object of the invention is to generally simplify and improve the form of percolator shown, described and claimed in my copending application, Serial No. 721,086, filed June 19, 1924, Patent #1,577,431.

A specific object of the invention is to provide a percolator of the above kind which is so constructed as to permit thorough cleaning of the same with facility and ease.

Another object of the invention is to provide simple and efficient means for preventing displacement of the tube and attached parts through which the boiling water is conveyed to the ground coffee, when such tube and attached parts are operatively disposed and the percolator is in use.

Still another object of the invention is to provide means to automatically allow operation of the percolator when the pot thereof is properly filled with water and to automatically render the coffee making operation inoperative when the water has boiled off to a predetermined low level, so that burning of the pot and other parts of the percolator is prevented under normal conditions.

With the above general objects in view, and others that will become apparent as the nature of the invention is better understood, the same consists in the novel form, combination and arrangement of parts hereinafter more fully described, shown in the accompanying drawings and claimed.

In the drawings, wherein like reference characters indicate corresponding parts throughout the several views, Figure 1 is a substantially central vertical sectional view of a percolator constructed in accordance with the present invention.

Figures 1, 4:
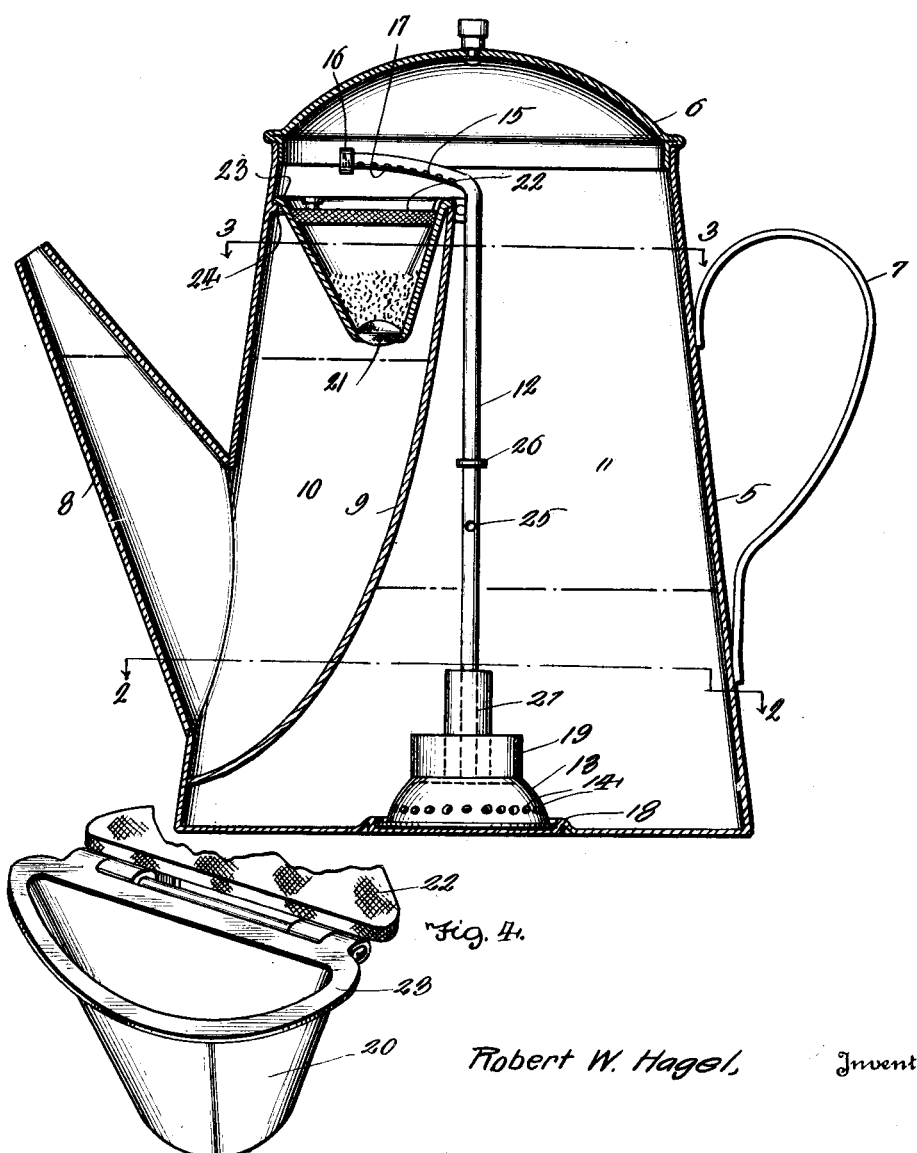
Figure 4 is an enlarged fragmentary perspective view of the container for the ground coffee.
Figure 2:
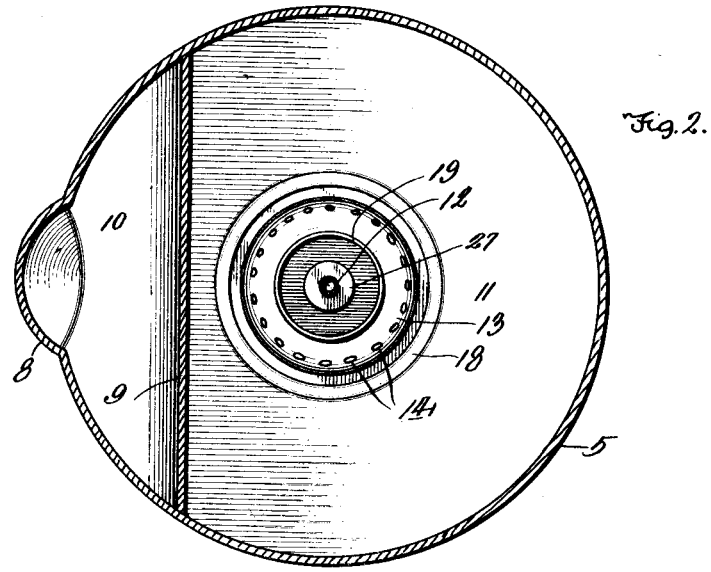
Figure 2 is a horizontal sectional view taken substantially upon line 2—2 of Figure 1.
Figure 3:
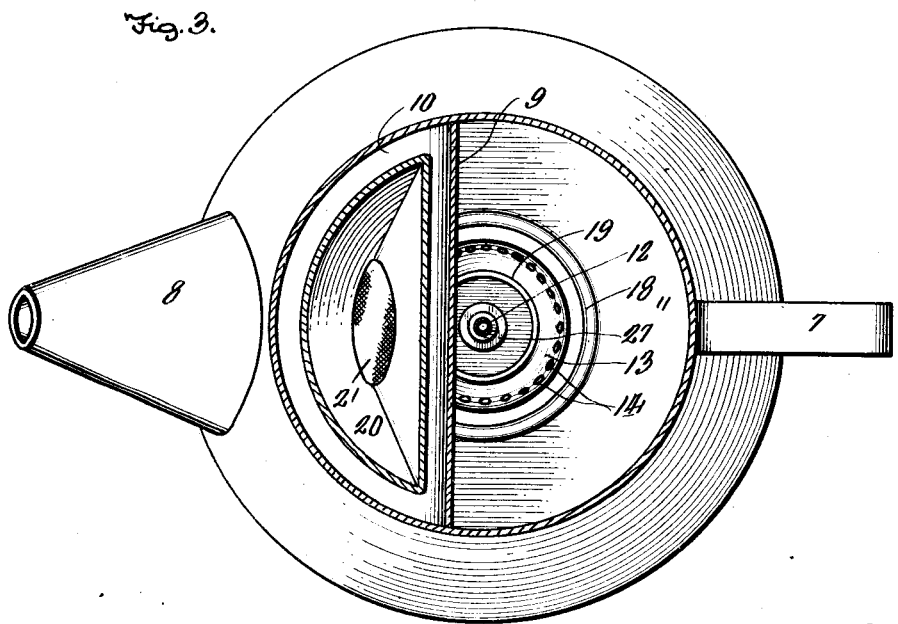
Figure 3 is a view similar to Figure 2 taken upon line 3—3 of Figure 1.

Referring more in detail to the drawings, the form of the invention herein shown embodies a pot 5 which is preferably of circular form in horizontal section and tapered slightly smaller in an upward direction with its open upper end closed by means of a removable cover 6 of a preferred form. The pot 5 has a handle 7 at the rear thereof and is formed with a relatively large tapering spout at its front side as at 8, the larger end of the spout being in communication with the pot near the bottom of the latter and extending upwardly at an inclination so as to terminate at a point in a horizontal plane near the top of the pot. The pot 5 is further divided into a pair of compartments by means of a partition 9 which extends from side to side of the pot and curves downwardly and forwardly where it is attached to the front wall of the pot adjacent to but spaced above the bottom wall of the pot as shown clearly in Figure 1. The partition 9 is so disposed as to present chambers with relatively large open upper ends so that access may be had to the compartments for thorough cleaning of the same with facility, and by terminating the forward compartment above the bottom of the pot the coffee in said forward compartment is prevented from boiling. By reason of the relatively large tapered form of the spout 8 considerable liquid coffee may normally be contained therein so that the capacity of the coffee pot is sufficiently large although the compartment for the water or rear compartment constitutes the major portion of the interior of the body of the coffee pot as shown. The forward liquid coffee compartment is indicated generally by the reference character 10, while the rear water compartment is indicated at 11.

A device is removably arranged within the pot 5 which may be termed a water siphon, and this device includes a vertical tube 12 having its lower end fixed in a central opening of a relatively large circular hollow base 13 which is provided with a circular horizontal series of openings around the side thereof as at 14. The tube 12 is of such length as to extend to a point above the top of the partition 9 when the base 13 is seated upon the bottom of the pot 5, and terminates in a forwardly projecting upper end portion 15 which is closed at its free end by means of a removable screw cap 16 and is provided on its under side with a longitudinal series of perforations 17. The upper end portion 15 of the tube 12 is so proportioned as to extend and overlie the top of the forward compartment 10, and the cap 16 is removable for permitting thorough cleaning of the siphon device with facility.

In order to properly locate the tube 12 centrally of the coffee pot, the bottom of the latter is formed with an annular upstanding central flange as at 18 within which the base 13 is adapted to be snugly seated. The flange 18 may be formed as shown by depressing a portion of the bottom wall of the pot in an upward direction.

Formed on the top of the base 13 in spaced concentric relation to and surrounding the lower end of the tube 12 is an upstanding flange 19 within the confines of which water will find its way for preventing lateral tilting or upward displacement of the siphon device when in use. This flange particularly steadies the siphon device so that upward displacement of the same is prevented from the boiling action of the water.

Suitably suspended in the upper end of the compartment 10 is a ground coffee container including a sheet metal body 20 of imperforate form but having open top and bottom ends the latter being closed by means of a foraminous bottom wall 21 and a foraminous hinged lid 22 is provided for the top. The ground coffee container is preferably of tapering form as shown with the smaller lower end thereof provided with the foraminous wall 21, and this wall 21 as well as the lid 22 are preferably constructed of relatively thick material so as to effectively retain a greater part of the impurities which may be conveyed with the water upwardly through the tube 12. The ground coffee is to be placed within the body of the container as clearly indicated in Figure 1, and the upper edge of the body 20 is preferably provided with a continuous outwardly directed flange 23 arranged to rest upon a ledge 24 on the wall of the pot 5 and the upper edge of the partition 9 whereby said ground coffee container is suspended in place directly beneath the horizontal or overhanging upper end 15 of the tube 12.

The tube 12 is provided intermediate its ends with a side opening 25 and is also provided with a suitable stop 26 at a point above this opening, which stop is preferably in the form of an annular shoulder or flange provided on the tube 12. Slidably mounted on the tube 12 below the flange 26 is a sleeve valve 27 of buoyant material, and this sleeve valve is adapted to be raised by the action of the water thereon within the pot 5 so that when sufficient water is contained in said pot the valve 27 will rise until arrested by the stop 26, at which time the valve will close the opening 25. When the opening 25 is thus closed the boiling water will be allowed to pass upwardly through the tube 12 for being delivered in jets through the openings 17 down onto the cover 22 of the ground coffee container. The water will then pass through the cover 22 and the ground coffee and will then pass into the compartment 10 in the form of liquid coffee. However, should sufficient coffee be made and the level of the water in the compartment 11 become unduly low, the float valve 27 will have sufficiently lowered to uncover the opening 25 so that the action of the siphoning device is stopped and no more of the water allowed to pass to the upper discharge end of the tube 12. Such boiling water as finds its way up through the tube 12 will then pass outwardly through the opening 25, and in this way complete exhaustion of the water in the chamber 11 is prevented automatically under normal conditions for preventing burning of the pot and the lower portion of the siphoning device.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:

1. In a percolator, a pot, a siphon device including a boiling-water conductor having a bottom inlet, a top outlet and an intermediate vent, and a float valve for automatically closing said vent when the water is above a predetermined level in the pot and for opening said vent when the water lowers to such level in the pot, said float valve comprising a valve sleeve of buoyant material slidably mounted on the water conductor, and means to limit the upward movement of the float valve on said conductor to a point wherein the same closes said vent.

2. In a percolator, a siphon device including a water conducting tube provided with a vent intermediate its inlet and outlet ends, and float valve means for opening and closing said vent, said float valve means comprising a sleeve valve of buoyant material slidable on the water conducting tube, and means to limit the upward closing movement of said valve.

3. The combination in a percolator of a pot having a bottom, an annular upstanding rib formed upon the inner surface of said bottom, a siphon device including a boiling water conducting tube provided with a supporting base, and an upstanding continuous flange upon the upper part of said base in surrounding spaced relation to the lower end of the tube, said supporting base having perforations therethrough to permit water to enter said tube and further being adapted for positioning within said annular rib.

In testimony whereof I affix my signature.

ROBERT W. HAGEL.